United States Patent
McDearmon et al.

(10) Patent No.: US 10,608,393 B2
(45) Date of Patent: Mar. 31, 2020

(54) CABLE CENTER LINE ADAPTERS FOR SWITCHGEAR RETRO-FIT APPLICATIONS

(71) Applicant: S&C Electric Company, Chicago, IL (US)

(72) Inventors: Bethany K McDearmon, Chicago, IL (US); Karl M Bogacz, Elk Grove Village, IL (US); Michael R Maroney, Chicago, IL (US); David J Beseda, Park Ridge, IL (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 16/278,519

(22) Filed: Feb. 18, 2019

(65) Prior Publication Data

US 2019/0319414 A1   Oct. 17, 2019

Related U.S. Application Data

(60) Provisional application No. 62/658,789, filed on Apr. 17, 2018.

(51) Int. Cl.
*H01R 13/62* (2006.01)
*H01R 31/06* (2006.01)
*H02B 13/00* (2006.01)

(52) U.S. Cl.
CPC ........... *H01R 31/06* (2013.01); *H02B 13/005* (2013.01)

(58) Field of Classification Search
CPC .............................. H01R 31/06; H02B 13/005
USPC ........................................................ 439/300
See application file for complete search history.

(56) References Cited

U.S. PATENT DOCUMENTS

| | | | | |
|---|---|---|---|---|
| 4,890,193 A * | 12/1989 | Tsubaki | ................... | H02B 5/06 361/612 |
| 5,427,538 A * | 6/1995 | Knapp | ................... | H01R 13/53 439/157 |
| 6,227,908 B1 * | 5/2001 | Aumeier | ............ | H01R 13/6593 439/186 |
| 6,292,356 B1 * | 9/2001 | Yamagiwa | ............... | H02B 1/22 218/70 |
| 6,452,785 B1 * | 9/2002 | Kaaden | ................ | H01R 9/2658 361/622 |
| 6,556,428 B1 * | 4/2003 | Takahoshi | ................ | H02B 1/22 361/604 |
| 6,726,062 B2 * | 4/2004 | Segiet | .................. | B67D 1/0029 222/129.1 |

(Continued)

*Primary Examiner* — Abdullah A Riyami
*Assistant Examiner* — Vladimir Imas

(57) ABSTRACT

A cable adapter that is operable to electrically couple an existing switchgear cable used for old switchgear to a connection location on new switchgear. The adapter includes an elbow portion that is configured to be electrically coupled to a connector for the switchgear cable and an extension portion that is electrically coupled to the elbow portion. The adapter also includes a cylindrical connection portion electrically coupled to the extension portion and being configured to be electrically coupled to the new switchgear at the proper location. In one embodiment, the elbow portion, the extension portion and the connection portion combine as a single piece member including an internal conductor, a dielectric insulation rubber layer covering the internal conductor and an outer semi-conductive rubber layer covering the insulation layer, where the rubber layers are molded over the conductor.

13 Claims, 2 Drawing Sheets

(56) References Cited

U.S. PATENT DOCUMENTS

| | | | | |
|---|---|---|---|---|
| 7,278,889 B2* | 10/2007 | Muench | ............... | H01R 13/53 |
| | | | | 439/729 |
| 7,568,927 B2* | 8/2009 | Hughes | ............... | H01R 13/187 |
| | | | | 439/181 |
| 7,572,133 B2* | 8/2009 | Hughes | ............ | H01H 33/66207 |
| | | | | 439/181 |
| 8,038,457 B2* | 10/2011 | Hughes | ............ | H01H 33/66207 |
| | | | | 439/181 |
| 8,690,016 B2* | 4/2014 | Anderson | ............... | B67D 1/06 |
| | | | | 222/1 |
| 8,791,379 B2* | 7/2014 | Kikukawa | ............... | H02B 1/22 |
| | | | | 200/5 A |
| 8,893,926 B2* | 11/2014 | Anderson | ............... | B67D 1/07 |
| | | | | 222/129.1 |
| 9,362,663 B2* | 6/2016 | Maroney | ............. | H01R 13/658 |
| 9,385,493 B2* | 7/2016 | Maroney | ............. | H01R 25/162 |
| 9,660,402 B2* | 5/2017 | Maroney | ............. | H01R 25/162 |
| 10,158,214 B1* | 12/2018 | Yanniello | ........... | H02B 13/0358 |
| 10,164,412 B1* | 12/2018 | Yanniello | ........... | H02B 13/0358 |
| 2005/0127098 A1* | 6/2005 | Bertone | ............... | A47J 31/401 |
| | | | | 222/129.1 |
| 2006/0207997 A1* | 9/2006 | Aguirre | ............... | B67D 1/0406 |
| | | | | 222/1 |
| 2016/0134065 A1* | 5/2016 | Gravermann | .......... | H01R 13/53 |
| | | | | 439/578 |

* cited by examiner

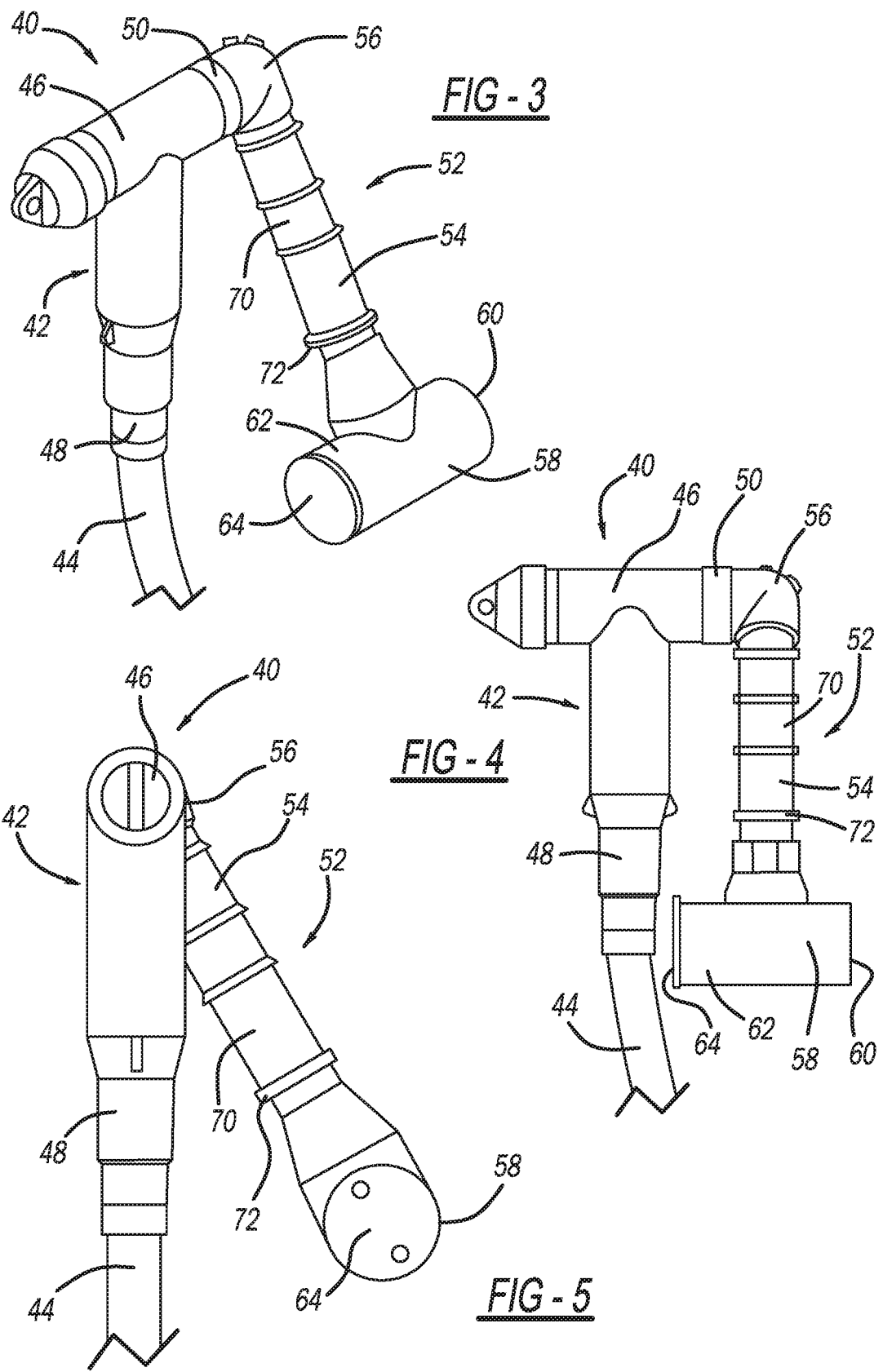

CABLE CENTER LINE ADAPTERS FOR SWITCHGEAR RETRO-FIT APPLICATIONS

CROSS-REFERENCE TO RELATED APPLICATION

This application claims the benefit of priority from the U.S. Provisional Application No. 62/658,789, filed on Apr. 17, 2018, the disclosure of which is hereby expressly incorporated herein by reference for all purposes.

BACKGROUND

Field

This disclosure relates generally to a cable adapter for connecting a cable to an electrical device and, more particularly, to a cable adapter configured to connect an existing cable previously connected to old switchgear to a new connection point on new switchgear.

Discussion of the Related Art

An electrical power distribution network, often referred to as an electrical grid, typically includes a number of power generation plants each having a number of power generators, such as gas turbine engines, nuclear reactors, coal-fired generators, hydro-electric dams, etc. The power plants provide a high voltage AC signal on high voltage transmission lines that deliver electrical power to a number of substations typically located within a community, where the voltage is stepped down to a medium voltage. The substations provide the medium voltage power to a number of three-phase feeder lines. The feeder lines are coupled to a number of lateral lines that provide the medium voltage to various transformers, where the voltage is stepped down to a low voltage and is provided to a number of loads, such as homes, businesses, etc.

Power distribution networks of the type referred to above include a number of switching devices, breakers, reclosers, interrupters, etc. that control the flow of power throughout the network. Some of these components are enclosed in a number of external housings that are mounted on, for example, a concrete pad, or mounted underground, and are generally referred to herein as switchgear. The number and type of switchgear are application specific to the particular power network. Switchgear of all types need to be maintained and periodically need to be replaced. As technology advances, the design and configuration of switchgear generally improves, for example, air-insulated switchgear may be replaced with gas-insulated switchgear which may then be replaced with dielectric-insulated switchgear.

Improvements, design changes, manufacturer changes, etc. to switchgear sometimes results in a change to the location on the switchgear where the electrical cables from, for example, the utility are connected. For example, when replacing elbow terminated switchgear, often times the cable attachment location of the new replacement switchgear does not match the cable attachment location of the old switchgear. Specifically, when the old switchgear is mounted on the pad, the electrical cables connected thereto are customized when they are installed so that they are of the proper length to be aligned with the connectors on the switchgear. When the old switchgear is removed and the new switchgear is put in place, the cables and other parts may need to be re-trained, re-worked, re-terminated or completely replaced to accommodate the cable attachment on the replacement switchgear. The work and materials required to reconfigure the existing cables, which may be thick, rigid and heavy, and the connector terminations to meet different termination locations on the new switchgear is expensive and can involve extensive work, such as replacing concrete pads, digging up old cables and/or trenching new cables, etc.

SUMMARY

The following discussion discloses and describes a cable adapter that is operable to electrically couple an existing switchgear cable used for old switchgear to a connection location on new switchgear. The adapter includes an elbow portion that is configured to be electrically coupled to a connector for the switchgear cable and an extension portion that is electrically coupled to the elbow portion. The adapter also includes a cylindrical connection portion electrically coupled to the extension portion and being configured to be electrically coupled to the new switchgear at the proper location. In one embodiment, the elbow portion, the extension portion and the connection portion combine as a single piece member including an internal conductor, a dielectric insulation rubber layer covering the internal conductor and an outer semi-conductive rubber layer covering the insulation layer, where the rubber layers are molded over the conductor.

Additional features of the disclosure will become apparent from the following description and appended claims, taken in conjunction with the accompanying drawings.

BRIEF DESCRIPTION OF THE DRAWINGS

FIG. 3 is an isometric view of a connection assembly separated from the switchgear and including a T-body connector coupled to a cable and a cable adapter coupled to the T-body connector;

FIG. 4 is a side view of the connection assembly; and

FIG. 5 is a front view of the connection assembly.

DETAILED DESCRIPTION OF THE EMBODIMENTS

The following discussion of the embodiments of the disclosure directed to a cable adapter configured to connect an existing cable for old switchgear to a new connection point on new switchgear is merely exemplary in nature, and is in no way intended to limit the invention or its applications or uses.

Figure 1:
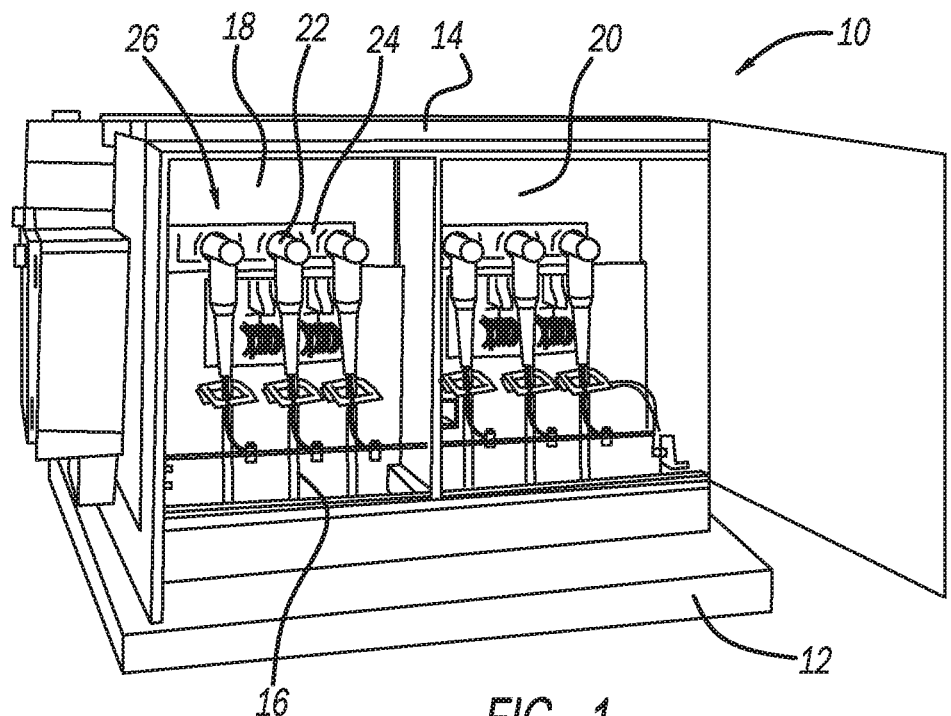
FIG. 1 is an isometric view of a known elbow mounted switchgear positioned on a concrete pad.

FIG. 1 is an isometric view of a known air-insulated elbow mounted switchgear 10 positioned on a concrete pad 12. For purposes of the discussion herein, the switchgear 10 is intended to represent any switchgear, pad mounted or otherwise, that includes any suitable configuration of components and devices configured in an outer housing 14 that provide switching and disconnecting of and between one or more electrical cables 16 coupled thereto that are part of an electrical distribution network. In this specific non-limiting example, six of the cables 16 are coupled to a front part of the switchgear 10 and six more of the cables (not shown) are coupled to a back part of the switchgear 10, where three of the cables 16 at the front and the back part are provided on one side 18 of the switchgear 10 and three of the cables 16 at the front and back part are provided on another side 20 of the switchgear 10. Each of the cables 16 is coupled to a T-body connector 22 that is electrically coupled to the switchgear 10 at cable attachment points 24 at an upper location 26 on the switchgear 10. It is noted that the T-body connector 22, typically used for a 600 amp connector, is shown by way of a non-limiting example in that any suitable cable connector can be used, such as a 200 amp elbow connector. As mentioned above, the cables 16 will be sized in length and suitable configured when they are installed so that they properly extend to the location 26 on the switchgear 10.

When the switchgear 10 reaches its end of life it will need to be replaced, where the model of the switchgear 10 may be obsolete and possibly unavailable. Also, it may be desired that the switchgear 10 be replaced with another type of switchgear, such as from a different manufacturer, or be upgraded with improved technology. In all of these cases, the location where the cables 16 to attach to the new switchgear may change.

Figure 2:
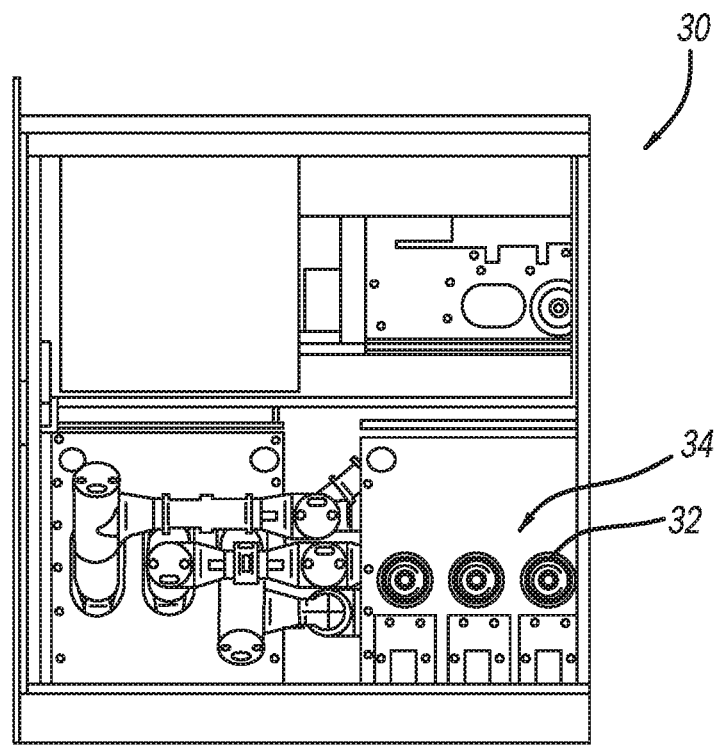
FIG. 2 is a front view of part of a replacement switchgear for the switchgear shown in FIG. 1.

FIG. 2 is a front view of a left side of a switchgear 30 that can replace the switchgear 10, where the switchgear 30 has a different design and configuration than the switchgear 10, which may be smaller, have a different configuration of components, use different types of components, etc., and where attachment points 32 for the cables 16 are at a lower location 34 than the cable attachment points 24. Therefore, the cables 16 may not be able to be connected to the attachment points 32 without being cut, reworked, re-terminated or replaced. In some cases, where the cables 16 may need to be replaced, trenches may need to be dug and the concrete pad 12 may need to be broken up.

FIG. 3 is an isometric view, FIG. 4 is a side view and FIG. 5 is a front view of a connection assembly 40 that includes a cable T-body connector 42 representing the T-body connector 22 and a cable 44 representing the cable 16, where the T-body connector 42 includes a connection portion 46 and an extension portion 48. As mentioned above, the T-body connector 42 is shown merely for illustrative purposes where other types of connector could be employed, such as elbow connectors. For the switchgear 10, a connection end 50 of the connection portion 46 would be directly connected both mechanically and electrically to the cable attachment points 24. However, for the new switchgear 30, the connection end 50 of the T-body connector 42 does not align with the cable attachment points 32.

In order to allow the cable 44 to be connected to the switchgear 30 at the cable attachment points 32 without having to reconfigure or re-terminate the cable 44, the connection assembly 40 also includes a general T-shaped cable adapter 52. The cable adapter 52 is a single piece member that includes an elbow portion 56 coupled to the connection end 50 of the connection portion 46 of the connector 42, an extension portion 54 coupled to the elbow portion 56, and a cylindrical connection portion 58 coupled to the elbow portion 56. The cable adapter 52 includes an internal conductor (not shown) that is properly configured so that the elbow portion 56 can be electrically coupled to the connection portion 46 of the connector 42 by an industry standard connection and a connection end 60 of the connection portion 58 can be mechanically and electrically coupled to the attachment point 32 on the switchgear 30, where the conductor at the connection end 60 has the proper connection configuration for the switchgear 30. A securing end 62 of the connection portion 58 includes a cap 64 that is removable to allow a worker to introduce a tool into the connection portion 58 and bolt the adapter 52 to the switchgear 30.

As mentioned, the cable adapter 52 includes an internal conductor. In one embodiment, the cable adapter 52 also includes an insulation layer, such as a rubber dielectric layer, covering the conductor, and a grounded semi-conductive outer layer 70, such as a semi-conductive rubber layer, covering the dielectric layer, which ensures that there is no exposure to energized conductors. In one embodiment, the internal conductor is inserted into the outer layer 70 and placed in a mold. The dielectric layer is injected between the conductor and the outer layer 70, and the layers are molded so that the rubber is cured and the cable adapter 52 is formed as a single piece member. It is noted that the molded configuration of the outer layer 70 and the dielectric layer allows the connection between the cable adapter 52 and the connector 42 and the connection between the cable adapter 52 and the switchgear 30 to be water tight and submersible. The outer layer 70 over the extension portion 54 includes a number of selectively positioned ribs 72 that identify locations where the outer layer 70 can be cut to a desired length prior to the internal conductor being inserted into the outer layer 70 before the molding process to be suitable for other switchgear that may have other connection points.

The cable adapter 52 can be replaced if a cable termination is not properly installed in the field and results in damage to the attachment point. This replaceability eliminates the need to uninstall the switchgear 30 and send it back to the factory in the event of such damage. This eliminates the need to rework/replace cables and cable accessories.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A cable adapter comprising:
an elbow portion configured to be electrically coupled to a switchgear connector that is coupled to a switchgear cable;
an adapter extension portion electrically coupled to the elbow portion; and
a connection portion electrically coupled to the extension portion where the extension portion and the connection portion define a T-shape, said connection portion being configured to be electrically coupled to a cable attachment point of a new switchgear; wherein
the elbow portion is encapsulated by a dielectric insulation layer that covers the internal conductor and an outer semi-conductive layer is molded over the dielectric insulation layer.

2. The adapter according to claim 1 wherein the connection portion is cylindrical.

3. The adapter according to claim 1, wherein the dielectric insulation layer is a rubber dielectric layer and the outer semi-conductive layer is a dielectric rubber layer.

4. The adapter according to claim 3 wherein the rubber dielectric layer comprises a plurality of dielectric rubber layers molded over the internal conductor.

5. The adapter according to claim 1 wherein the adapter is a single piece member.

6. The adapter according to claim 1 wherein the connection portion includes a cap that covers an opening in the connection portion that allows the adapter to be secured to the new switchgear.

7. A connection assembly for connecting a switchgear cable to new switchgear, said assembly comprising:

a switchgear connector electrically coupled to the switchgear cable and including a switchgear connection portion configured to be coupled to old switchgear; and a cable adapter including an adapter extension portion electrically coupled to the switchgear connection portion and an adapter connection portion configured to be electrically coupled to the new switchgear, wherein the cable adapted includes an elbow portion configured to be electrically coupled to a switchgear connector that is coupled to a switchgear cable;

an adapter extension portion electrically coupled to the elbow portion; and a connection portion electrically coupled to the extension portion, said connection portion being configured to be electrically coupled to a cable attachment point of a new switchgear; and the elbow portion is encapsulated by a dielectric insulation layer that covers the internal conductor and an outer semi-conductive layer is molded over the dielectric insulation layer.

8. The assembly according to claim 7 wherein the adapter connection portion is cylindrical and wherein the adapter extension portion and the adapter connection portion define a T-shape.

9. The assembly according to claim 7 wherein the rubber dielectric layer comprises a plurality of rubber layers molded over the internal conductor.

10. The assembly according to claim 7 wherein the adapter is a single piece member.

11. The assembly according to claim 7 wherein the adapter connection portion includes a cap that covers an opening in the adapter connection portion that allows the cable adapter to be secured to the new switchgear.

12. A cable adapter comprising:

an elbow portion configured to be electrically coupled to a switchgear connector that is coupled to a switchgear cable, wherein the switchgear connector is configured to be electrically coupled to a cable attachment point of an old switchgear;

an extension portion electrically coupled to the elbow portion; and a cylindrical connection portion electrically coupled to the extension portion where the extension portion and the connection portion define a T-shape, said connection portion being configured to be electrically coupled to a cable attachment point of a new switchgear, wherein the elbow portion, the extension portion and the connection portion include an internal conductor, a dielectric insulation rubber layer encapsulating the internal conductor and an outer semi-conductive rubber layer encapsulating the insulation layer, where the rubber layers are molded and cured over the internal conductor so that the cable adapter is a single piece member.

13. The adapter according to claim 12 wherein the connection portion includes a cap that covers an opening in the connection portion that allows the adapter to be secured to the new switchgear.

\* \* \* \* \*